United States Patent
Oh et al.

(10) Patent No.: US 9,864,251 B2
(45) Date of Patent: Jan. 9, 2018

(54) COLOR CHANGEABLE DEVICE

(71) Applicant: ELECTRONICS AND TELECOMMUNICATIONS RESEARCH INSTITUTE, Daejeon (KR)

(72) Inventors: Ji-Young Oh, Daejeon (KR); Jae Bon Koo, Daejeon (KR); Joo Yeon Kim, Daejeon (KR); Bock Soon Na, Daejeon (KR); Chan Woo Park, Daejeon (KR); Sang Seok Lee, Sejong (KR); Soon-Won Jung, Daejeon (KR); Seong-Mok Cho, Daejeon (KR); Hye Yong Chu, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/007,844

(22) Filed: Jan. 27, 2016

(65) Prior Publication Data
US 2016/0246151 A1 Aug. 25, 2016

(30) Foreign Application Priority Data
Feb. 25, 2015 (KR) .................. 10-2015-0026311

(51) Int. Cl.
*G02F 1/15* (2006.01)
*G02F 1/155* (2006.01)

(52) U.S. Cl.
CPC ...... *G02F 1/155* (2013.01); *G02F 2001/1519* (2013.01)

(58) Field of Classification Search
CPC ............ G02F 1/155; G02F 2001/1519; G02F 2001/1502
USPC ................... 359/265–275; 345/105
See application file for complete search history.

(56) References Cited

U.S. PATENT DOCUMENTS

| 2003/0087127 | A1 | 5/2003 | Lee et al. |
| 2004/0189187 | A1* | 9/2004 | Chang ............... H01L 51/5281 313/503 |
| 2010/0000590 | A1* | 1/2010 | Huang ............... H01L 31/048 136/244 |
| 2012/0091923 | A1* | 4/2012 | Kastner-Jung ......... F21S 10/02 315/360 |
| 2012/0307339 | A1 | 12/2012 | Son et al. |
| 2013/0081678 | A1* | 4/2013 | Naito ..................... H01B 1/02 136/252 |

(Continued)

FOREIGN PATENT DOCUMENTS

KR    10-2011-0060336 A    6/2011

*Primary Examiner* — Tuyen Tra
(74) *Attorney, Agent, or Firm* — Rabin & Berdo, P.C.

(57) ABSTRACT

Provided is a color changeable device which includes a first substrate and a second substrate that are spaced apart from each other, a first transparent electrode disposed on the first substrate, a second transparent electrode disposed on the second substrate, an electrochromic layer disposed between the first transparent electrode and the second transparent electrode, an organic layer disposed between the first transparent electrode and the electrochromic layer. The organic layer may include a hole injection layer or an electron injection layer. The organic layer may further include a hole transport layer or an electron transport layer.

19 Claims, 5 Drawing Sheets

(56) References Cited

U.S. PATENT DOCUMENTS

| | | | |
|---|---|---|---|
| 2014/0158997 A1 | 6/2014 | Ahn et al. | |
| 2016/0178982 A1* | 6/2016 | Lee | G02B 6/0055 359/265 |
| 2016/0225832 A1* | 8/2016 | Kwon | G02F 1/133555 |

* cited by examiner

COLOR CHANGEABLE DEVICE

CROSS-REFERENCE TO RELATED APPLICATIONS

This U.S. non-provisional patent application claims priority under 35 U.S.C. §119 of Korean Patent Application No. 10-2015-0026311, filed on Feb. 25, 2015, the entire contents of which are hereby incorporated by reference.

BACKGROUND OF THE INVENTION

The present disclosure herein relates to a color changeable device, and more particularly, to the electrochromic device.

Liquid crystal displays (LCDs) and organic light-emitting diodes (OLEDs) have been widely used as information displays. These devices generate various colors by transmitting light from their own light source through a color filter or generate colors from light that is emitted in response to a current flow in a material itself. On behalf of such emissive display devices, interest in reflective displays using external light has been greatly increased.

Electrochromism denotes characteristics in which optical properties, such as color, transmittance, or reflectance, of a material are reversibly changed by an electrochemical reaction when an electric field is applied. With respect to an electrochromic device, its color and transmittance may be changed according to an applied electric field, an external light source is not required, and its reflectance is excellent. Thus, the electrochromic device has been used as an optical shutter, an electrochromic mirror (ECM) for automobiles, a reflective display, or a smart window.

In the electrochromic device, when an ion conductive layer or an electrolyte is disposed between electrodes and an external voltage is applied to the electrodes, a potential difference between the electrodes occurs. Then, ions or electrons in the ion conductive layer or the electrolyte move to an electrochromic layer to cause a redox reaction. Due to the redox reaction of the electrochromic layer, the color or transmittance of the electrochromic device changes. For the color changes of the electrochromic device, diffusion of ions from the electrolyte to the electrochromic layer is required.

SUMMARY OF THE INVENTION

The present disclosure provides a color changeable device that is improved response time for color change and decolorization.

The object of the present disclosure is not limited to the aforesaid, but other objects not described herein will be clearly understood by those skilled in the art from descriptions below.

An embodiment of the inventive concept provides a color changeable device including a first substrate; a second substrate spaced apart from the first substrate; a first transparent electrode on the first substrate; a second transparent electrode on the second substrate; an electrochromic layer between the first transparent electrode and the second transparent electrode; and an organic layer between the first transparent electrode and the electrochromic layer. The organic layer may include a hole injection layer or an electron injection layer.

In some embodiments, the hole injection layer may include poly(3,4-ethylenedioxythiophene):poly(4-styrenesulfonate) (PEDOT:PSS), poly(9-vinylcarbazole) (PVK), poly[(9,9-dioctylfluorenyl-2,7-diyl)-co-(4,4'-(N-(4-sec-butylphenyl)diphenylamine)] (TFB), 4,4-bis[N-(1-naphthyl)-N-phenyl-amino]biphenyl (α-NPD), or N,N'-bis(3-methylphenyl)-N,N'-diphenyl(1,1'-biphenyl)-4,4'-diamine (TPD). The organic layer may further include a hole transport layer. The hole transport layer may include 4,4',4"-tris[2-naphthyl(phenyl)amino] triphenylamine (2-TNATA), 4,4',4"-tris(2-methylphenyl-phenylamino)triphenylamine (m-MTDATA), tris(1-phenylisoquinoline)iridium(III) (Ir(piq)$_3$), bis[2-(1-isoquinolinyl-N)phenyl-C](2,4-pentanedionato-O2,O4) iridium(III) (Ir(piq)$_2$(acac)), or 5,6,11,12-tetraphenyl naphthacene (rubrene). The hole injection layer and the hole transport layer may be mixed to form a single layer.

In some embodiments, the electron injection layer may include polyethylenimine ethoxylated (PEIE) or ZnO. The organic layer may further include an electron transport layer. The electron transport layer may include tris-(8-hydroxyquinoline)aluminum (Alq3), 2,2,2"-(1,3,5-benzinetriyl)-tris (1-phenyl-1-H-benzimidazole) (TPBi), 2,5-bis(5-tert-butylbenzoxazol-2-yl)thiophene (BBOT), 2-(4-biphenylyl)-5-phenyl-1,3,4-oxadiazole (PBD), (3-(s)-[(benzyloxycarbonyl)methyl]-1,4-dioxane-2,5-dione (BMD), Ir(piq)$_3$, Ir(piq)$_2$(acac), or rubrene. The electron injection layer and the electron transport layer may be mixed to form a single layer.

In some embodiments, the electrochromic layer may include $WO_3$ or PEDOT:PSS.

In some embodiments, the first transparent electrode and the second transparent electrode may include aluminum (Al), TiN, indium tin oxide (ITO), indium zinc oxide (IZO), or graphene.

In some embodiments, the first substrate and the second substrate may be flexible material substrates. The flexible material substrate may include polyethylene terephthalate (PET), polycarbonate (PC), or polyethylene naphthalate (PEN).

BRIEF DESCRIPTION OF THE DRAWINGS

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION OF PREFERRED EMBODIMENTS

Figure 1:
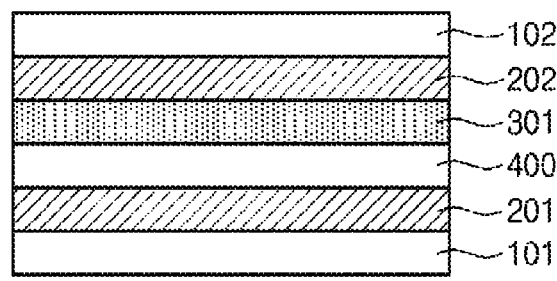
FIG. 1 is a cross-sectional view illustrating a color changeable device according to an embodiment of the inventive concept.

Preferred embodiments of the inventive concept will be described below in more detail with reference to the accompanying drawings in order to fully understand the constitution and effect of the inventive concept. The inventive concept may, however, be embodied in different forms and should not be constructed as limited to the embodiments set forth herein. Rather, these embodiments are provided so that this disclosure will be thorough and complete, and will fully convey the scope of the inventive concept to those skilled in the art. Those skilled in the art will understand that the present inventive concept can be implemented in an appropriate environment. Like numbers refer to like elements throughout.

In the following description, the technical terms are used only for explaining a specific exemplary embodiment while not limiting the inventive concept. The terms of a singular form may include plural forms unless referred to the contrary. It will be understood that the terms "comprises" and/or "comprising", when used in this specification, specify the presence of stated elements, steps, operations, and/or components, but do not preclude the presence or addition of one or more other elements, steps, operations, components, and/or groups thereof.

In addition, it will be understood that when a surface (or layer) is referred to as being "on" another surface (or layer) or substrate, it can be directly on the other surface (or layer) or substrate, or a third surface (or layer) may also be present therebetween.

Also, though terms like a first, a second, and a third are used to describe various regions and surfaces (or layers) in various embodiments of the inventive concept, the regions and the surfaces are not limited to these terms. These terms are used only to distinguish one region or surface (or layer) from another region or surface (or layer). Thus, a surface referred to as a first surface in one embodiment may also be referred to as a second surface in another embodiment. An embodiment described and exemplified herein includes a complementary embodiment thereof. Like reference numerals refer to like elements throughout.

Additionally, the embodiment in the detailed description will be described with sectional and/or plan views as ideal exemplary views of the inventive concept. In the figures, the thicknesses of layers and regions are exaggerated for clarity of illustration. Accordingly, shapes of the exemplary views may be modified according to manufacturing techniques and/or allowable errors. Therefore, the embodiments of the inventive concept are not limited to the specific shape illustrated in the exemplary views, but may include other shapes that may be created according to manufacturing processes. For example, an etched region illustrated as a rectangle may have rounded or curved features. Areas exemplified in the drawings have general properties, and are used to illustrate a specific shape of a device region. Thus, this should not be construed as limited to the scope of the inventive concept.

Unless otherwise defined, all terms used herein have the same meaning as commonly understood by one of ordinary skill in the art to which this inventive concept belongs.

Hereinafter, the present disclosure will be described in detail by describing preferred embodiments of the inventive concept with reference to the accompanying drawings.

The inventive concept relates to color changeable devices.

FIG. 1 is a cross-sectional view illustrating a color changeable according to an embodiment of the inventive concept.

Referring to FIG. 1, a first substrate 101 is provided. A second substrate 102 spaced apart from the first substrate 101 is provided. The first substrate 101 and the second substrate 102 may include a flexible material substrate. For example, the first substrate 101 and the second substrate 102 may include polyethylene terephthalate (PET), polycarbonate (PC), or polyethylene naphthalate (PEN). Alternatively, the first substrate 101 and the second substrate 102 may include a stretchable substrate. For example, the first substrate 101 and the second substrate 102 may include polydimethylsiloxane (PDMS) or polyurethane (PU).

A first transparent electrode 201 may be disposed on the first substrate 101. A second transparent electrode 202 may be disposed on the second substrate 102. The first transparent electrode 201 and the second transparent electrode 202 may include aluminum (Al), TiN, indium tin oxide (ITO), indium zinc oxide (IZO), or graphene.

An electrochromic layer 301 may be disposed between the first transparent electrode 201 and the second transparent electrode 202. The electrochromic layer 301 may have a thickness of about 2 nm to about 1,000 nm. When a voltage is applied between the first transparent electrode 201 and the second transparent electrode 202, the electrochromic layer 301 may be subjected to an oxidation reaction or a reduction reaction. Optical properties of the electrochromic layer 301 may be reversibly changed by the oxidation reaction or reduction reaction. The electrochromic layer 301 may be an electrochromic (EC) device. For example, the electrochromic layer 301 may include $WO_3$ or poly(3,4-ethylenedioxythiophene):poly(4-styrenesulfonate) (PEDOT:PSS).

An organic layer 400 may be disposed between the first transparent electrode 201 and the electrochromic layer 301. The organic layer 400 may have a thickness of about 2 nm to about 1,000 nm. The organic layer 400 may include a charge injection layer. The charge injection layer may include a hole injection material. For example, the hole injection material may include PEDOT:PSS, poly(9-vinylcarbazole) (PVK), poly[(9,9-dioctylfluorenyl-2,7-diyl)-co-(4,4'-(N-(4-sec-butylphenyl)diphenylamine)] (TFB), 4,4-bis[N-(1-naphthyl)-N-phenyl-amino]biphenyl (α-NPD), or N,N'-bis(3-methylphenyl)-N, N'-diphenyl(1,1'-biphenyl)-4, 4'-diamine (TPD). The charge injection layer may include an electron injection material. For example, the electron injection material may include polyethylenimine ethoxylated (PEIE) or ZnO.

The organic layer 400 may further include a charge transport layer. The charge transport layer may include a hole transport material. For example, the hole transport material may include 4,4',4"-tris[2-naphthyl(phenyl)amino]triphenylamine (2-TNATA) or 4,4',4"-tris(2-methylphenylphenylamino)triphenylamine (m-MTDATA). The charge transport layer may include an electron transport material. For example, the electron transport material may include tris-(8-hydroxyquinoline)aluminum (Alq3), 2,2,2"-(1,3,5-benzinetriyl)-tris(1-phenyl-1-H-benzimidazole) (TPBi), 2,5-bis(5-tert-butyl-benzoxazol-2-yl)thiophene (BBOT), 2-(4-biphenylyl)-5-phenyl-1,3,4-oxadiazole (PBD), or (3-(s)-[(benzyloxycarbonyl)methyl]-1,4-dioxane-2,5-dione (BMD). The hole transport material or the electron transport material may further include tris(1-phenylisoquinoline)iridium(III) ($Ir(piq)_3$), bis[2-(1-isoquinolinyl-N)phenyl-C] (2,4-pentanedionato-O2,O4)iridium(III) ($Ir(piq)_2(acac)$), or 5,6,11,12-tetraphenyl naphthacene (rubrene).

Alternatively, the organic layer 400 may include a single layer including the hole transport material and the hole injection material, or a single layer including the electron transport material and the electron injection material.

According to an embodiment of the inventive concept, the organic layer may be used as a charge carrier layer for the electrochromic layer. Thus, a partition wall or encapsulation for confining the electrolyte is not required, and a decrease in stability due to the evaporation of solvent does not occur. Accordingly, a color changeable device having excellent structural stability and visibility may be provided in which its manufacturing process is simplified. Also, since the organic layer is used, a flexible substrate or a stretchable substrate may be used in the color changeable device.

Figure 2:
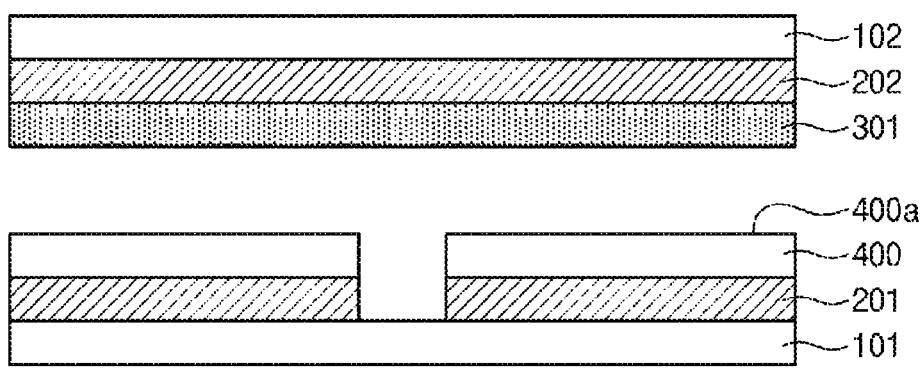
FIGS. 2 and 3 are cross-sectional views illustrating a manufacturing process of the color changeable device of FIG. 1.
Figure 3:
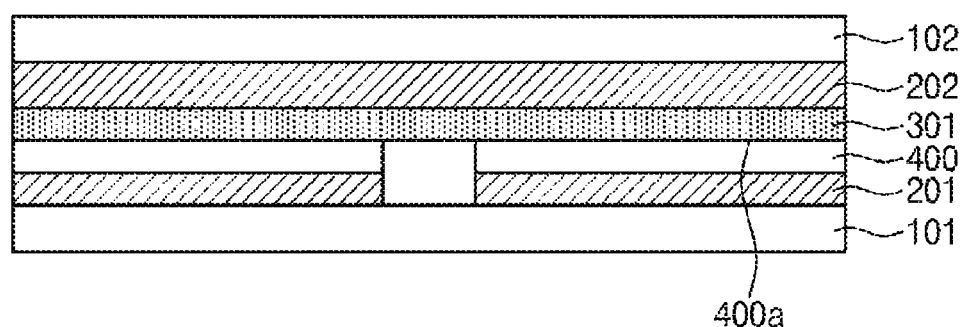

The color changeable device 10 according to the embodiment of the inventive concept may be manufactured as follows. FIGS. 2 and 3 are cross-sectional views illustrating a manufacturing process of the color changeable device 10 of FIG. 1.

Referring to FIG. 2, a transparent conductive layer may be disposed on the first substrate 101. For example, the transparent conductive layer may be deposited by a sputtering method. The first transparent electrode 201 may be formed by patterning the deposited transparent conductive layer. The organic layer 400 may be disposed on the first transparent electrode 201. For example, a charge injection layer may be stacked on the first transparent electrode 201. For example, a charge transport layer may be further stacked on the charge injection layer. For example, the organic layer 400 may be a single layer composed of an injection material and a transport material. Since the organic layer 400 is an organic thin film, the organic layer 400 may be deposited by a vacuum deposition or solution-based deposition method. For example, the organic layer 400 may be deposited by a vacuum deposition method including a vacuum deposition polymerization method, a sputtering method, a vacuum thermal deposition method, or an electron beam deposition method. For example, the organic layer 400 may be deposited by the solution-based deposition method including spin coating, bar coating, or spray coating. The organic layer 400 may be patterned in a predetermined shape. For example, the organic layer 400 may be locally disposed on only a portion of the first transparent electrode 201.

A transparent conductive layer may be disposed on the second substrate 102. For example, the transparent conductive layer may be deposited by a sputtering method. The second transparent electrode 202 may be formed by patterning the deposited transparent conductive layer. The electrochromic layer 301 may be disposed on the second transparent electrode 202. Since the electrochromic layer 301 is an organic thin film, the electrochromic layer 301 may be deposited by a vacuum deposition or solution-based deposition method. For example, the electrochromic layer 301 may be deposited by a vacuum deposition method including a vacuum deposition polymerization method, a sputtering method, a vacuum thermal deposition method, or an electron beam deposition method. For example, the electrochromic layer 301 may be deposited by the solution-based deposition method including spin coating, bar coating, or spray coating. The electrochromic layer 301 may be patterned in a predetermined shape. For example, the electrochromic layer 301 may be locally disposed on only a portion of the second transparent electrode 202.

The color changeable device 10 may further include an adhesive member (not shown) between the first substrate 101 and the second substrate 102. The adhesive member (not shown) may be disposed between the electrochromic layer 301 and the organic layer 400. For example, the adhesive member (not shown) may have a thickness of about 1 nm to about 10 nm. Alternatively, the adhesive member (not shown) may be included in the electrochromic layer 301. The adhesive member (not shown) may include monomolecular alcohols or a polymer. For example, the adhesive member (not shown) may include sorbitol, glycerin, glycerol, or terpineol.

Referring to FIG. 3, the first substrate 101 and the second substrate 102 may be bonded to each other. The first substrate 101 and the second substrate 102 may be bonded by a pressurizing process. For example, the first substrate 101 and the second substrate 102 may be laminated by a roll laminator. The electrochromic layer 301 and the organic layer 400 may be pressed by a pressurizing process. Thus, gaps between the first substrate 101 and the second substrate 102 according to a deposition thickness may be the same. Alternatively, the first substrate 101, the first transparent electrode 201, the organic layer 400, the electrochromic layer 301, and the second transparent electrode 202 are deposited and encapsulation with a protective layer may then be performed. A portion (e.g., 400a), in which the first transparent electrode 201 and the second transparent electrode 202 are electrically in contact with each other, may also be localized due to the local arrangement of the first transparent electrode 201 or the organic layer 400. Only the portions (e.g., 400a), in which the first transparent electrode 201 and the second transparent electrode 202 are electrically in contact with each other, may exhibit an electrochromic effect. For example, the portions (e.g., 400a), in which the first transparent electrode 201 and the second transparent electrode 202 are electrically in contact with each other, may respectively function as a pixel.

Figure 4:
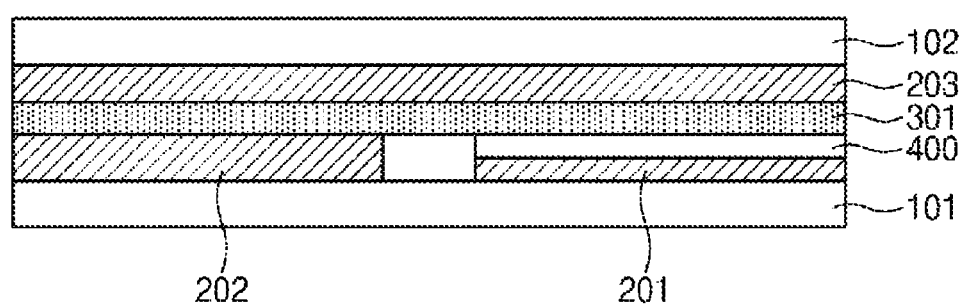
FIG. 4 is a cross-sectional view illustrating the color changeable device according to an embodiment of the inventive concept.

FIG. 4 is a cross-sectional view illustrating the color changeable device 20 according to an embodiment of the inventive concept.

Referring to FIG. 4, a first substrate 101 is provided. A second substrate 102 spaced apart from the first substrate 101 is provided. The first substrate 101 and the second substrate 102 may include a flexible material substrate. For example, the first substrate 101 and the second substrate 102 may include PET, PC, or PEN. Alternatively, the first substrate 101 and the second substrate 102 may include a stretchable substrate. For example, the first substrate 101 and the second substrate 102 may include PDMS or PU.

A first transparent electrode 201 may be disposed on the first substrate 101. A second transparent electrode 202 may be disposed on the first substrate 101. The first transparent electrode 201 and the second transparent electrode 202 may be spaced apart from each other. A third transparent electrode 203 may be disposed on the second substrate 102. The first to third transparent electrodes 201, 202, and 203 may include Al, TiN, ITO, IZO, or graphene. The third transparent electrode 203 may function as a bridge electrode. For example, electrical connection between the first transparent electrode 201 and the second transparent electrode 202 may be improved by the third transparent electrode 203.

An electrochromic layer 301 may be disposed between the first and second transparent electrodes 201 and 202 and the third transparent electrode 203. The electrochromic layer 301 may have a thickness of about 2 nm to about 1,000 nm. When a voltage is applied between the first transparent electrode 201 and the second transparent electrode 202, the electrochromic layer 301 may be subjected to an oxidation reaction or a reduction reaction. Optical properties of the electrochromic layer 301 may be reversibly changed by the oxidation reaction or the reduction reaction. The electrochromic layer 301 may be an electrochromic (EC) device. For example, the electrochromic layer 301 may include $WO_3$ or PEDOT:PSS.

An organic layer 400 may be disposed between the first transparent electrode 201 and the electrochromic layer 301. The organic layer 400 may have a thickness of about 2 nm to about 1,000 nm. The organic layer 400 may include a charge injection layer. The charge injection layer may include a hole injection material. For example, the hole injection material may include PEDOT:PSS, poly(9-vinyl-carbazole) (PVK), poly[(9,9-dioctylfluorenyl-2,7-diyl)-co-(4,4'-(N-(4-sec-butylpheny)diphenylamine)] (TFB), 4,4-bis [N-(1-naphthyl)-N-phenyl-amino]biphenyl (α-NPD), or N,N'-bis(3-methylphenyl)-N,N'-diphenyl(1,1'-biphenyl)-4,4'-diamine (TPD). The charge injection layer may include an electron injection material. For example, the electron injection material may include polyethylenimine ethoxylated (PEIE) or ZnO.

The organic layer 400 may further include a charge transport layer. The charge transport layer may include a hole transport material. For example, the hole transport material may include 4,4',4"-tris[2-naphthyl(phenyl)amino] triphenylamine (2-TNATA) or 4,4',4"-tris(2-methylphenyl-phenylamino)triphenylamine (m-MTDATA). The charge transport layer may include an electron transport material. For example, the electron transport material may include tris-(8-hydroxyquinoline)aluminum (Alq3), 2,2,2"-(1,3,5-benzinetriyl)-tris(1-phenyl-1-H-benzimidazole) (TPBi), 2,5-bis(5-tert-butyl-benzoxazol-2-yl)thiophene (BBOT), 2-(4-biphenylyl)-5-phenyl-1,3,4-oxadiazole (PBD), or (3-(s)-[(benzyloxycarbonyl)methyl]-1,4-dioxane-2,5-dione (BMD). The hole transport material or the electron transport material may further include tris(1-phenylisoquinoline) iridium(III) (Ir(piq)₃), bis[2-(1-isoquinolinyl-N)phenyl-C] (2,4-pentanedionato-O2,O4)iridium(III) (Ir(piq)₂(acac)), or 5,6,11,12-tetraphenyl naphthacene (rubrene).

Alternatively, the organic layer 400 may include a single layer including the hole transport material and the hole injection material, or a single layer including the electron transport material and the electron injection material.

Figure 5:
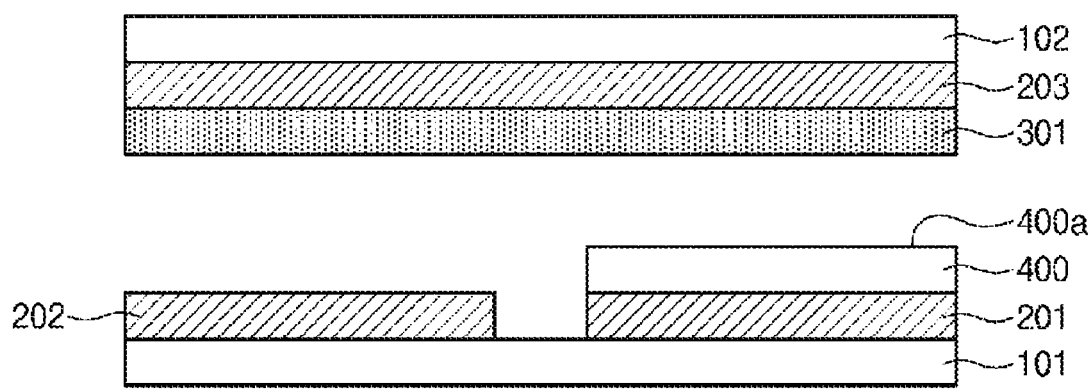
FIGS. 5 and 6 are cross-sectional views illustrating a manufacturing process of the color changeable device of FIG. 4.
Figure 6:
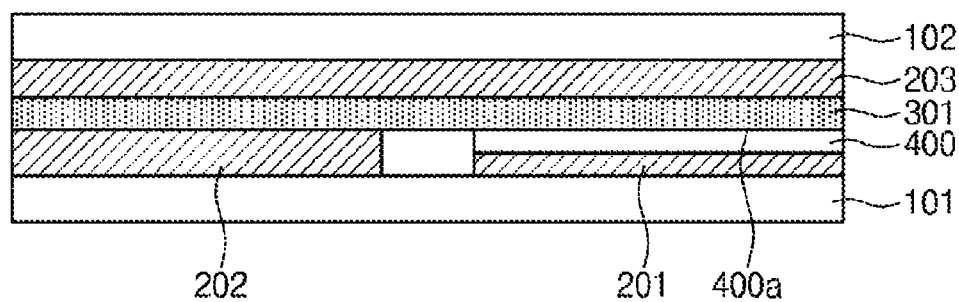

The color changeable device 20 according to another embodiment of the inventive concept may be manufactured as follows. FIGS. 5 and 6 are cross-sectional views illustrating a manufacturing process of the color changeable device of FIG. 4.

Referring to FIG. 5, a transparent conductive layer may be disposed on the first substrate 101. For example, the transparent conductive layer may be deposited by a sputtering method. The first transparent electrode 201 and the second transparent electrode 202 may be formed by patterning the deposited transparent conductive layer. The organic layer 400 may be disposed on the first transparent electrode 201. For example, a charge injection layer may be stacked on the first transparent electrode 201. For example, a charge transport layer may be further stacked on the charge injection layer. For example, the organic layer 400 may be a single layer composed of an injection material and a transport material. Since the organic layer 400 is an organic thin film, the organic layer 400 may be deposited by a vacuum deposition or solution-based deposition method. For example, the organic layer 400 may be deposited by a vacuum deposition method including a vacuum deposition polymerization method, a sputtering method, a vacuum thermal deposition method, or an electron beam deposition method. For example, the organic layer 400 may be deposited by the solution-based deposition method including spin coating, bar coating, or spray coating. The organic layer 400 may be patterned in a predetermined shape. For example, the organic layer 400 may be locally disposed on only a portion of the first transparent electrode 201.

A transparent conductive layer may be disposed on the second substrate 102. For example, the transparent conductive layer may be deposited by a sputtering method. The third transparent electrode 203 may be formed by patterning the deposited transparent conductive layer. The electrochromic layer 301 may be disposed on the third transparent electrode 203. Since the electrochromic layer 301 is an organic thin film, the electrochromic layer 301 may be deposited by a vacuum deposition or solution-based deposition method. For example, the electrochromic layer 301 may be deposited by a vacuum deposition method including a vacuum deposition polymerization method, a sputtering method, a vacuum thermal deposition method, or an electron beam deposition method. For example, the electrochromic layer 301 may be deposited by the solution-based deposition method including spin coating, bar coating, or spray coating. The electrochromic layer 301 may be patterned in a predetermined shape. For example, the electrochromic layer 301 may be locally disposed on only a portion of the third transparent electrode 203.

The color changeable device 20 may further include an adhesive member (not shown) between the first substrate 101 and the second substrate 102. The adhesive member (not shown) may be disposed between the electrochromic layer 301 and the organic layer 400. For example, the adhesive member (not shown) may have a thickness of about 1 nm to about 10 nm. Alternatively, the adhesive member (not shown) may be included in the electrochromic layer 301. The adhesive member (not shown) may include monomolecular alcohols or a polymer. For example, the adhesive member (not shown) may include sorbitol, glycerin, glycerol, and terpineol.

Referring to FIG. 6, the first substrate 101 and the second substrate 102 may be bonded to each other. The first substrate 101 and the second substrate 102 may be bonded by a pressurizing process. For example, the first substrate 101 and the second substrate 102 may be laminated by a roll laminator. The electrochromic layer 301 and the organic layer 400 may be pressed by a pressurizing process. Thus, gaps between the first substrate 101 and the second substrate 102 according to a deposition thickness may be the same. Alternatively, the first substrate 101, the first transparent electrode 201, the second transparent electrode 202, the organic layer 400, the electrochromic layer 301, and the third transparent electrode 203 are deposited and encapsulation with a protective layer may then be performed.

Figure 7:
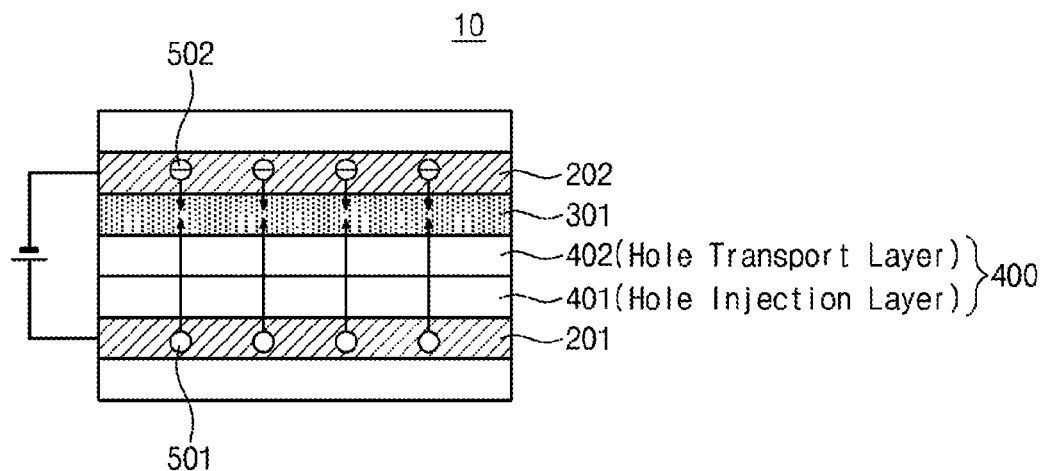
FIGS. 7 and 8 are conceptual views illustrating an operation of the color changeable devices according to the inventive concept.
Figure 8:
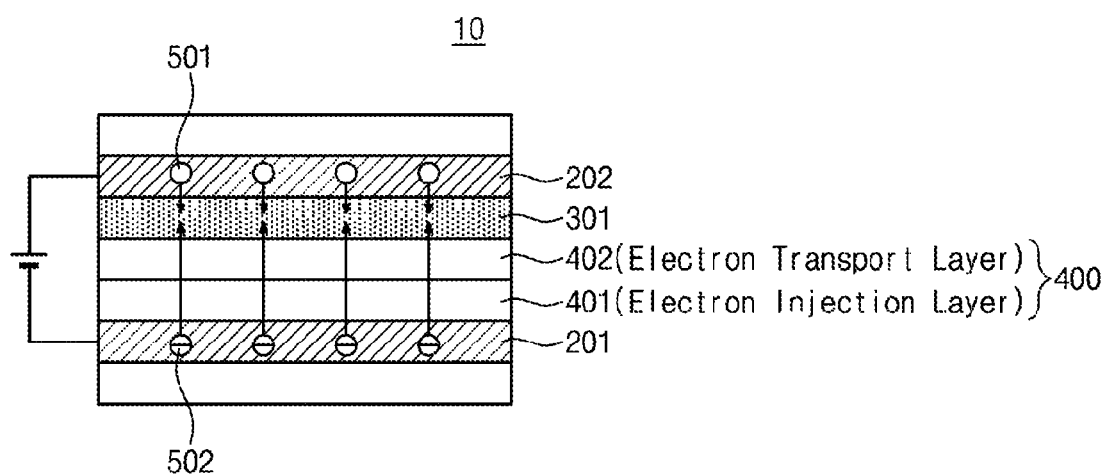

FIGS. 7 and 8 are conceptual views illustrating an operation of the color changeable device according to the inventive concept. Referring to FIG. 7, a charge injection layer 401 may be a hole injection layer. A charge transport layer 402 may be a hole transport layer. A voltage may be applied to the color changeable device 10 in a direction from the first transparent electrode 201 to the second transparent electrode 202. Holes 501 may be generated in the first transparent electrode 201. The holes 501 may pass through the hole injection layer and the hole transport layer. The holes 501 may reach the electrochromic layer 301. Electrons 502 may be generated in the second transparent electrode 202. The electrons 502 may reach the electrochromic layer 301. The holes 501 and the electrons 502 may be combined in the electrochromic layer 301. Electrochromism of the electrochromic layer 301 may occur due to the combination of the holes 501 and the electrons 502. Thus, the electrochromic layer 301 may be in a colored state. The holes may be effectively transferred from the first electrode 201 to the electrochromic layer 301 due to the use of the hole injection layer or the hole transport layer and response speed may be improved.

Referring to FIG. 8, the charge injection layer 401 may be an electron injection layer. The charge transport layer 402 may be an electron transport layer. A voltage may be applied to the color changeable device 10 in a direction from the second transparent electrode 202 to the first transparent electrode 201. Electrons 502 may be generated in the first transparent electrode 201. The electrons 502 may pass through the electron injection layer and the electron transport layer. The electrons 502 may reach the electrochromic layer 301. Holes 501 may be generated in the second transparent electrode 202. The holes 501 may reach the electrochromic layer 301. The holes 501 and the electrons 502 may be combined in the electrochromic layer 301. Electrochromism of the electrochromic layer 301 may occur due to the combination of the holes 501 and the electrons 502. Thus, the electrochromic layer 301 may be in a colored state. The electrons may be effectively transferred from the first electrode 201 to the electrochromic layer 301 due to the use of the electron injection layer or the electron transport layer and the response speed may be improved.

Figure 9:
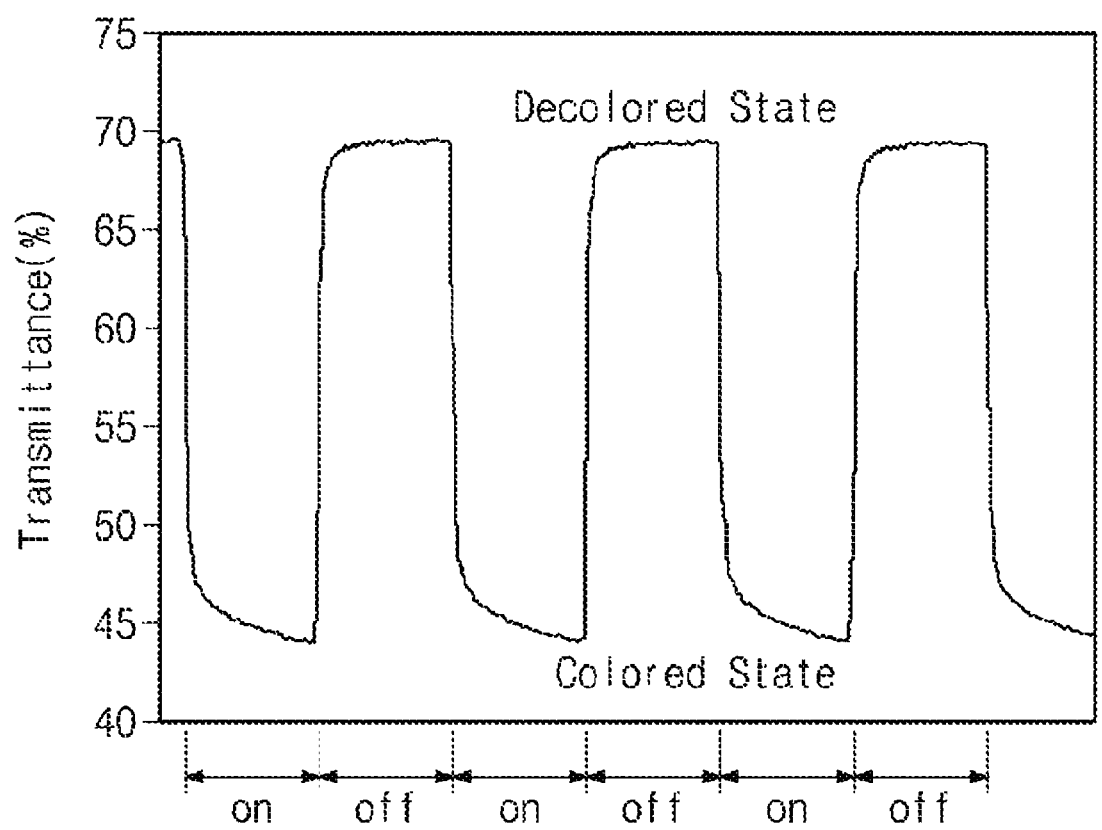
FIG. 9 is a graph illustrating transmittance of the color changeable devices according to the embodiment of the inventive concept.

FIG. 9 is a graph illustrating transmittance of the color changeable device according to the embodiment of the inventive concept. Referring to FIG. 9, the color changeable device may be in a colored state when an external voltage is applied (on-state). For example, the color changeable device may have a transmittance of about 40% to about 45% in the colored state. The color changeable device may be in a decolored state when the external voltage is removed (off-state). For example, the color changeable device may have a transmittance of about 65% to about 70% in the decolored state.

According to an embodiment of the inventive concept, response time for color change and decolorization of the color changeable devices is improved. Also, durability and reversible reliability of the color changeable device are improved, and a manufacturing process may be simplified.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed. Accordingly, it is to be understood that the inventive concept has been described by way of illustration and not limitation.

What is claimed is:

1. A color changeable device comprising:
a first substrate;
a second substrate spaced apart from the first substrate;
a first transparent electrode on the first substrate;
a second transparent electrode on the second substrate;
an electrochromic layer between the first transparent electrode and the second transparent electrode and including an adhesive; and
an organic layer between the first transparent electrode and the electrochromic layer,
wherein the organic layer comprises one of a hole injection layer and an electron injection layer, and
wherein the organic layer directly contacts the first transparent electrode and the electrochromic layer,
wherein the organic layer comprises an electron injection layer, and the electron injection layer directly contacts the first transparent electrode.

2. The color changeable device of claim 1, wherein the hole injection layer comprises poly(3,4-ethylenedioxythiophene):poly(4-styrenesulfonate) (PEDOT:PSS), poly(9-vinylcarbazole) (PVK), poly[(9,9-dioctylfluorenyl-2,7-diyl)-co-(4,4'-(N-(4-sec-butylphenyl)diphenylamine)] (TFB), 4,4-bis[N-(1-naphthyl)-N-phenyl-amino]biphenyl (α-NPD), or N,N'-bis(3-methylphenyl)-N,N'-diphenyl(1,1'-biphenyl)-4,4'-diamine (TPD).

3. The color changeable device of claim 2, wherein the organic layer further comprises a hole transport layer.

4. The color changeable device of claim 3, wherein the hole transport layer comprises 4,4',4"-tris[2-naphthyl(phenyl)amino] triphenylamine (2-TNATA), 4,4',4"-tris(2-methylphenyl-phenylamino)triphenylamine (m-MTDATA), tris (1-phenylisoquinoline)iridium(III) (Ir(piq)$_3$), bis[2-(1-isoquinolinyl-N)phenyl-C](2,4-pentanedionato-O2,O4) iridium(III) (Ir(piq)$_2$(acac)), or 5,6,11,12-tetraphenyl naphthacene (rubrene).

5. The color changeable device of claim 3, wherein the hole injection layer and the hole transport layer are mixed to form a single layer.

6. The color changeable device of claim 1, wherein the electron injection layer comprises polyethylenimine ethoxylated (PEIE) or ZnO.

7. The color changeable device of claim 6, wherein the organic layer further comprises an electron transport layer.

8. The color changeable device of claim 7, wherein the electron transport layer comprises tris-(8-hydroxyquinoline) aluminum (Alq3), 2,2,2"-(1,3,5-benzinetriyl)-tris(1-phenyl-1-H-benzimidazole) (TPBi), 2,5-bis(5-tert-butyl-benzoxazol-2-yl)thiophene (BBOT), 2-(4-biphenylyl)-5-phenyl-1,3,4-oxadiazole (PBD), (3-(s)-[(benzyloxycarbonyl)methyl]-1,4-dioxane-2,5-dione (BMD), Ir(piq)$_3$, Ir(piq)$_2$(acac), or rubrene.

9. The color changeable device of claim 7, wherein the electron injection layer and the electron transport layer are mixed to form a single layer.

10. The color changeable device of claim 1, wherein the electrochromic layer comprises WO$_3$ or PEDOT:PSS.

11. The color changeable device of claim 1, wherein the first transparent electrode and the second transparent electrode comprise aluminum (Al), TiN, indium tin oxide (ITO), indium zinc oxide (IZO), or graphene.

12. The color changeable device of claim 1, wherein the first substrate and the second substrate are flexible material substrates.

13. The color changeable device of claim 12, wherein the flexible material substrate comprises polyethylene terephthalate (PET), polycarbonate (PC), or polyethylene naphthalate (PEN).

14. The color changeable device according to claim 1, wherein the adhesive member is connected to the electrochromic layer to form one body.

15. A color changeable device comprising:
a first substrate;
a second substrate spaced apart from the first substrate;
a first transparent electrode on the first substrate;
a second transparent electrode on the first substrate and spaced apart from the first transparent electrode;
a third transparent electrode on the second substrate facing the first transparent electrode and the second transparent electrode;
an electrochromic layer between the first transparent electrode and the third transparent electrode; and
an organic layer between the first transparent electrode and the electrochromic layer,
wherein the organic layer comprises a hole injection layer or an electron injection layer.

16. The color changeable device according to claim 15, wherein a height of the second transparent electrode corresponds to a combined height of the first transparent electrode plus the organic layer.

17. The color changeable device according to claim 15, wherein a first surface of the second transparent electrode contacts the first substrate and a second surface of the second transparent electrode opposite the first surface contacts the electrochromic layer.

18. The color changeable device according to claim 15, wherein the third transparent electrode faces the first transparent electrode and the second transparent electrode, such that the third transparent electrode functions as a bridge electrode between the first transparent electrode and the second transparent electrode when a current is applied between the first transparent electrode and the second transparent electrode.

19. The color changeable device according to claim 15, wherein the electrochromic layer has a thickness between about 50 nm and about 1,000 nm.

* * * * *